Patented Mar. 3, 1931

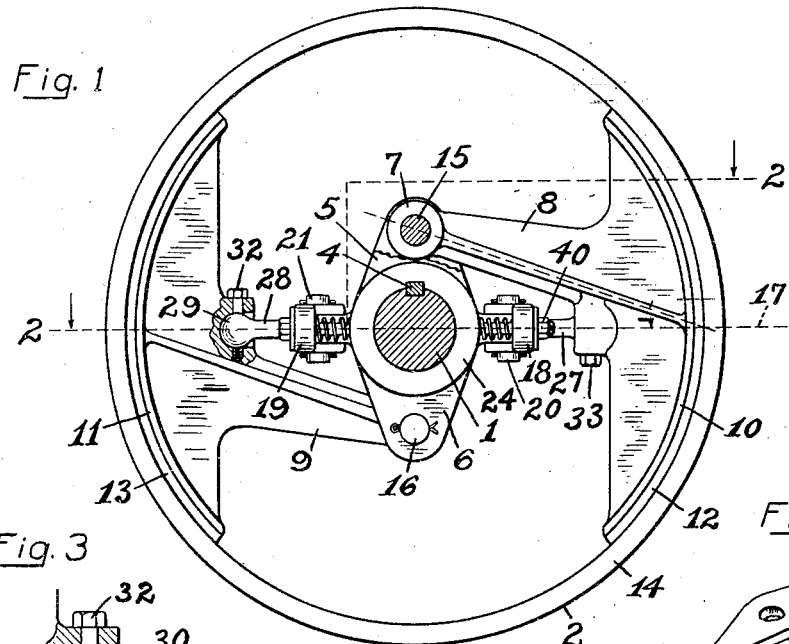

1,795,083

UNITED STATES PATENT OFFICE

ROY F. DEHN, OF CLEVELAND, OHIO

FRICTION CLUTCH

Application filed September 17, 1927, Serial No. 220,277. Renewed July 30, 1930.

This invention relates to friction clutches, and has for its main object to provide a friction clutch having shoes which will exert throughout their entire contact surfaces evenly distributed pressure to secure maximum frictional efficiency of the shoes and the even wearing away thereof.

Another object of the invention is to provide a friction clutch of the above character, in which the pressure is equally distributed to each shoe.

A further object of the invention is to provide a friction clutch of the above character, in which the shoes will adjust themselves to the driven drum even when there is a slight misalignment of the driving and driven shafts.

A further object of the invention is to provide a friction clutch of the above character, in which the adjustment of the shoes relative to the driven drum is accomplished by one common adjusting means.

In order that the invention may be clearly understood, the same will be hereinafter fully described as illustrated in the accompanying drawings, and the novel features thereof will be distinctly pointed out in the appended claims.

In the drawings similar characters of reference are used to indicate corresponding parts.

Figure 1 is an elevation or end view of a friction clutch constructed in accordance with my invention, certain parts being broken away to better show the construction thereof, Fig. 2 is a plan sectional view taken on line 2—2 of Fig. 1, Fig. 3 is a sectional view illustrating the ball and socket connections of the links with the shoes, Fig. 4 is a perspective view of one of the levers, Fig. 5 illustrates a modification of the means for adjusting the levers, Fig. 6 is a plan sectional view of the left hand portion of Fig. 5 taken on line 6—6 illustrating the connection of the levers with the ring member.

Referring to the drawings, 1 represents the power or driving shaft and 2 the driven drum which is loosely mounted upon said shaft and is adapted to transmit power. For transmitting the power from the driving shaft 1 to the driven drum 2, a hub 3 is fixed to said shaft by means of a key 4, and this hub has formed integrally therewith pairs of oppositely extending lateral arms indicated by 5 and 6. Arranged between the pairs of arms 5 and 6 are the hubs, indicated by 7, of a pair of lever-arms 8 and 9 formed integrally with shoes 10 and 11, which carry on their faces suitable frictional pieces 12 and 13 adapted to engage the inner side of the annular rim 14 of the driven drum 2. The ends 7 of the lever-arms are pivotally connected to the arms 5 and 6 in diametrical alignment by pins 15 and 16 respectively, to permit swinging movement of said arms so as to bring the shoes 10 and 11 into or out of engagement with the rim 14. An important feature of this invention is that the arms 5 and 6 normally are on an angle extending from said pivotal points 15 and 16 to the transverse center lines of the frictional pieces 12 and 13 of the shoes 10 and 11 and the driven drum 2, and said transverse center lines are in alignment with a line at right angles to said diametrical line passing through the pivotal points 15 and 16 and indicated by 17.

For forcing the shoes 10 and 11 into engagement with the rim 14 of the drum 2, levers 18 and 19 are pivoted at 20 and 21 respectively to oppositely disposed lateral lugs 22 and 23 formed integrally with a collar 24, which is mounted upon the driving shaft 1. This collar is adapted to turn with said driving shaft but slide longitudinally thereupon, and this is accomplished by utilizing the before mentioned key 4. The inner ends of the levers 18 and 19 are provided with sockets as 25 for receiving the ball ends, indicated by 26, of links 27 and 28, the other ball ends of which, indicated by 29, rest in sockets, indicated by 30, of the shoes 10 and 11. The ball ends 26 and 29 are provided with outwardly flared openings, as indicated at 31, for receiving bolts or pins 32 and 33 for pivotally connecting said ends to the levers and shoes and yet permitting sufficient free movement at these points for the proper functioning of the parts. For adjusting the levers 18 and 19, their outer or free ends are provided with opposite openings, as indicated at 34, for receiving an adjusting bolt 35, which passes loosely through openings, indicated by 36, of the collar 24, and a slotted recess 37 through the driving shaft 1. The openings 34 are enlarged at their inner ends and tapered to permit rocking movement of the levers 18 and 19 upon the adjusting bolt 35, and the outer sides of said levers are provided with semi-cylindrical recesses which extend transversely as at 38 for receiving similar shaped blocks as 39 through which the adjusting bolt 35 passes. A nut 40 is threaded upon the end of said adjusting bolt for the purpose of drawing the free ends of the levers 18 and 19 together, and coiled springs 41 and 42 are arranged on said adjusting bolt between the collar 24 and said levers tending to force outwardly the free ends of said levers. By turning the single and conveniently located nut 40, proper adjustment of the levers 18 and 19 may be made to take up the wear on the shoes 11 and 12. Due to the single and loosely mounted adjusting bolt 35 and the coiled springs 41 and 42, the adjustment of the shoes 11 and 12 is equalized. For actuating said shoes, the collar 24 is slidably moved upon the shaft 1 by manual manipulation or any suitable mechanism.

In Figs. 5 and 6 are shown a modification of the means for adjusting the levers indicated by 43 and 44, which are similar to the levers 18 and 19, for avoiding the need of the slotted recess 37 through the driving shaft 1. To the shaft 45 at 46 is keyed a collar 47 having opposite recesses at 48 for expansion springs as 49 and 50, which rest in recesses as at 51 of the levers 43 and 44. For drawing together said levers, a pair of semi-circular ring members 52 and 53 are pivotally connected at 54, and their free ends are connected together by a turn-buckle 55. For permitting rocking movement of the levers 43 and 44, said levers are provided with semi-circular depressions indicated at 56, and the ring members 52 and 53 with correspondingly rounding portions at 57 for resting in said depressions.

Said modification of the means for adjusting the levers does not affect the actuating of said levers by the sliding movement of the collar 24 for forcing the shoes into and out of engagement with the drum as already described.

It is readily seen that in a frictional clutch, constructed as described, the frictional surfaces of the shoes 10 and 11 are forced evenly against the inner side of the rim 14 of the drum due to said shoes being an equal length at each side of the transverse diameter of the drum indicated by 17, and said shoes being pivotally supported at 15 and 16 by the lever-arms 8 and 9, which normally extend in the direction of lines from said pivotal points to the intersection of the transverse diameter of the drum, and the application of the actuating power on said transverse diameter against the centers of said shoes through the links 27 and 28 by the sliding movement of the collar 24 and the levers 18 and 19 carried thereby. This even contact of the shoes with the rim because the shoes are pivotally supported at 15 and 16 and therefore actuated substantially in a straight line by the links 27 and 28, gives the maximum friction efficiency of the shoes, even wearing thereof, and but little effort is required on the part of the operator for actuating the clutch. When necessary to adjust the shoes 10 and 11 for taking up wear, this may be accomplished quickly and easily by turning the single nut 40, or in the modifications the turn-buckle 55, or the nuts 68 and 69.

It will be understood that slight changes in the details of construction may be made within the scope of the claims, and also that by holding the drum 2 against rotation, the shoes 10 and 11 would serve as brakes for locking the shaft 1 against rotation.

Having fully described my invention, what I claim is:

1. In a friction clutch, the combination of a shaft, a drum loosely mounted on the shaft, a hub, the hub being fixed to said shaft, a collar, the collar being rotatable with and movable longitudinally upon said shaft, shoes adapted to engage the drum, arms extending from the transverse centers of the shoes, the free ends of the arms being pivotally supported by the hub, links engaging said shoes, levers carried by said collar for actuating the links upon longitudinal movement of the collar, a single means for adjusting said levers, and means for equalizing the adjustment of said levers.

2. In a friction clutch, the combination of a shaft, a drum loosely mounted on the shaft, a hub, the hub being fixed to said shaft, a collar, the collar being rotatable with and movable longitudinally upon said shaft, shoes adapted to engage the drum, arms extending from the transverse centers of the shoes, the free ends of the arms being pivotally supported by the hub, links engaging said shoes, levers carried by said collar for actuating the links upon longitudinal movement of the collar, and means operative at a single point for adjusting all of said levers at the same time.

3. In a friction clutch, the combination of a shaft, a drum loosely mounted on the shaft, a hub, the hub being fixed to said shaft, a collar, the collar being rotatable with and movable longitudinally upon said shaft, shoes adapted to engage the drum, arms extending from the transverse centers of the shoes, the free ends of the arms being pivotally supported by the hub, links engaging said shoes, levers carried by said collar for actuating the links upon longitudinal movement of the collar, means operatively connecting said levers, and means operative at one point for adjusting all of said levers relative to said collar.

4. In a friction clutch, the combination of a shaft, a drum loosely mounted on the shaft, a hub, the hub being fixed to said shaft, a collar, the collar being rotatable with and movable longitudinally upon said shaft, shoes adapted to engage the drum, arms extending from the transverse centers of the shoes, the free ends of the arms being pivotally supported by the hub, links engaging said shoes, levers carried by said collar for actuating the links upon longitudinal movement of the collar, means operatively connecting said levers, and means operative at a single point for operating the first mentioned means.

5. In a friction clutch, the combination of a shaft, a drum loosely mounted on the shaft, a hub, the hub being fixed to said shaft, a collar, the collar being rotatable with and movable longitudinally upon said shaft, shoes adapted to engage the drum, arms extending from the transverse centers of the shoes, the free ends of the arms being pivotally supported by the hub, links engaging said shoes, levers pivotally supported by said collar, the levers having one end engaging said links, a common means for adjusting the other ends of said levers relative to said collar, and means for equalizing the adjustment of said levers.

6. In a friction clutch, the combination of a shaft, a drum loosely mounted on the shaft, a hub, the hub being fixed to said shaft, a collar, the collar being rotatable with and movable longitudinally upon said shaft, shoes adapted to engage the drum, arms extending from the transverse centers of the shoes, the free ends of the arms being pivotally supported by the hub, links engaging said shoes, levers pivotally supported by said collar, the levers having one end engaging said links, means tending to force the free ends of said levers outwardly, and means operative at one point adapted to draw the free ends of said levers inwardly.

7. In a friction clutch, the combination of a shaft, a drum loosely mounted on the shaft, a hub, the hub being fixed to said shaft, a collar, the collar being rotatable with and movable longitudinally upon said shaft, shoes adapted to engage the drum, arms extending from the transverse centers of the shoes, the free ends of the arms being pivotally supported by the hub, links engaging said shoes, levers pivotally supported by said collar, the levers having one end engaging said links, springs adapted to force the free ends of said levers outwardly from said collar, and means operative at one point adapted to draw the free ends of said levers toward said collar.

8. In a friction clutch, the combination of a shaft, a drum loosely mounted on the shaft, a hub, the hub being fixed to said shaft, a collar, the collar being rotatable with and movable longitudinally upon said shaft, shoes adapted to engage the drum, arms extending from the transverse centers of the shoes, the free ends of the arms being pivotally supported by the hub, links engaging said shoes, levers pivotally supported by said collar, the levers having one end engaging said links, said shaft and said collar and the free ends of said levers being provided with transverse aligning openings, a bolt passing through said openings, springs arranged upon said bolt between the free ends of said levers and said collar, and a nut on said bolt for adjusting the free ends of said levers relative to said collar.

9. In a friction clutch, the combination of a shaft, a drum loosely mounted on the shaft, a hub, the hub being fixed to said shaft, a collar, the collar being rotatable with and movable longitudinally upon said shaft, shoes adapted to engage the drum, arms extending from the transverse centers of the shoes, the free ends of the arms being pivotally supported by the hub, links engaging said shoes, levers pivotally supported by said collar, the levers having one end engaging said links, said shaft and said collar and the free ends of said levers being provided with transverse aligning openings, a bolt passing through said openings, springs arranged upon said bolt between the free ends of said levers and said collar, a nut on said bolt for adjusting the free ends of said levers relative to said collar, and the opening of said shaft being of sufficient size to permit longitudinal movement of said collar.

10. In a friction clutch, the combination of a shaft, a drum loosely mounted on the shaft, a hub, the hub being fixed to said shaft, a collar, the collar being rotatable with and movable longitudinally upon said shaft, shoes adapted to engage the drum, arms extending from the transverse centers of the shoes, the free ends of the arms being pivotally supported by the hub, links engaging said shoes, levers pivotally supported by said collar, the levers having one end engaging said links, the free ends of said levers and said collar being provided with transverse aligning openings, said shaft being provided with a recess in alignment with said openings, a bolt passing through said openings and said recess, the head of the bolt engaging one of said levers, a nut on the other end of the bolt engaging the other of said levers, springs arranged upon said bolt between said levers and said collar, and the recess in said shaft being of sufficient size to permit longitudinal movement of said collar relative to said shaft.

In testimony whereof I affix my signature.
ROY F. DEHN.